United States Patent [19]

Wharton et al.

[11] Patent Number: 4,766,390

[45] Date of Patent: Aug. 23, 1988

[54] CRT FILAMENT SUPPLY FOR MULTIPLE FREQUENCY VIDEO APPARATUS

[75] Inventors: James H. Wharton; Peter D. Osman, both of Indianapolis, Ind.

[73] Assignee: RCA Licensing Corporation, Princeton, N.J.

[21] Appl. No.: 20,004

[22] Filed: Feb. 27, 1987

[51] Int. Cl.[4] .................... H01J 19/82; H05B 39/00
[52] U.S. Cl. .................................. 328/270; 315/94; 315/105
[58] Field of Search ................ 328/270; 315/364, 411, 315/101, 105, 370, 94, 97-99, 106; 358/190, 242, 243

[56] References Cited

U.S. PATENT DOCUMENTS 3,798,369  3/1974  Dietch ................................ 328/270
3,956,669  5/1976  Del Ciello .......................... 328/270
4,481,476  11/1984 Ferritsen ............................ 328/270

Primary Examiner—Stanley D. Miller
Assistant Examiner—Timothy P. Callahan
Attorney, Agent, or Firm—Eugene M. Whitacre; Joseph J. Laks; Sammy S. Henig

[57] ABSTRACT

A video apparatus capable of operating at different line deflection frequencies incorporates a CRT electron gun assembly heater supply voltage circuit that maintains a constant rms voltage level independent of the line deflection frequency. The heater supply includes a transformer winding located on the line deflection driver transformer. The duty cycle of the developed AC voltage waveform remains substantially constant independent of the line deflection frequency, so that the AC voltage may be applied to the heater circuit.

1 Claim, 1 Drawing Sheet

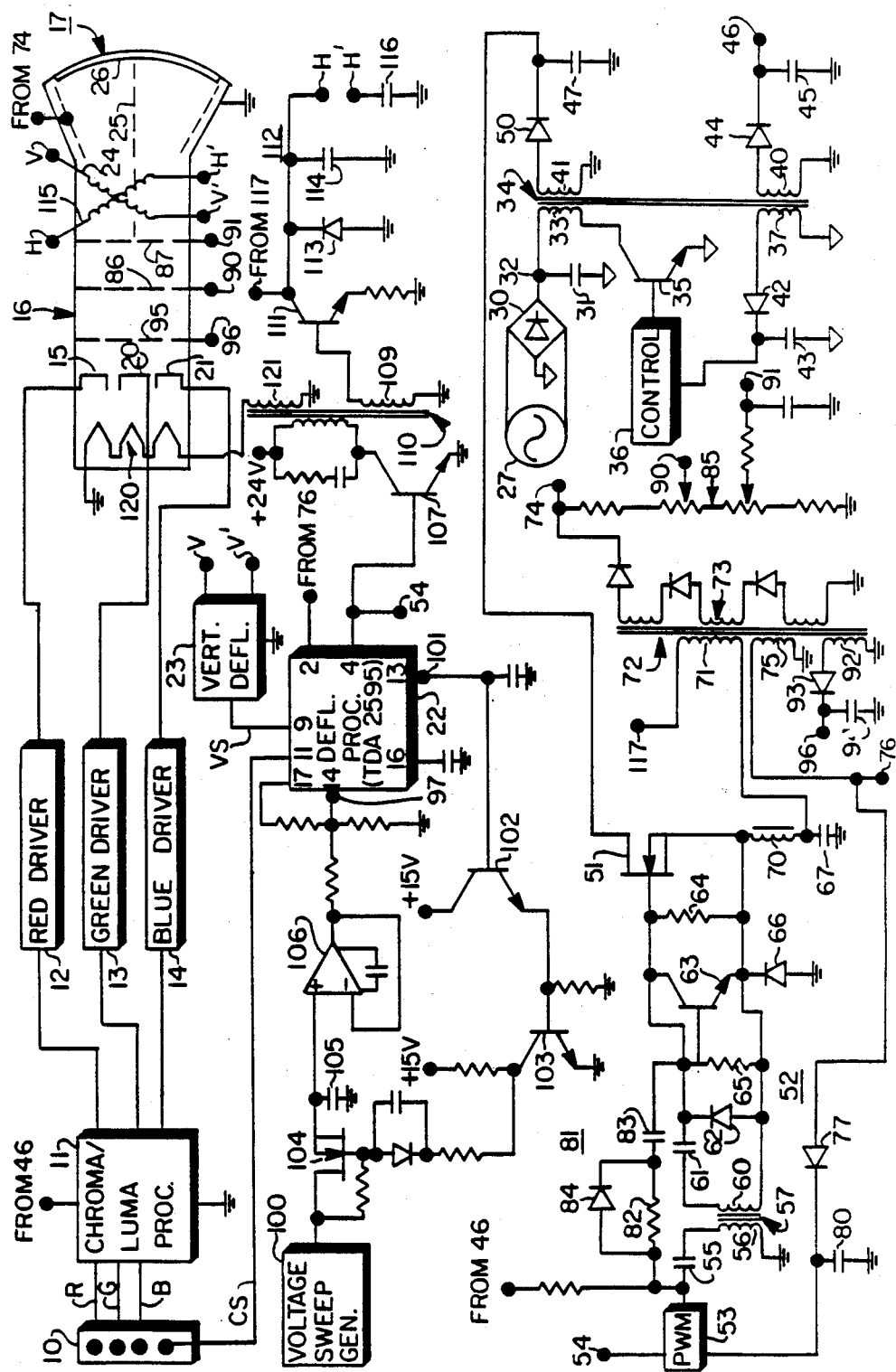

CRT FILAMENT SUPPLY FOR MULTIPLE FREQUENCY VIDEO APPARATUS

This invention relates to video apparatus and, in particular, to video apparatus capable of operating at more than one line deflection frequency.

A video apparatus, such as a television receiver or a computer monitor, includes various load circuits that may operate at different supply voltage levels. A common power supply format utilizes a transformer having a primary winding energized at the line deflection frequency. The voltages developed across various secondary windings are used to power the load circuits of the video apparatus. Energization of the primary winding is accomplished by the application of the unregulated B+ voltage by action of a switching transistor. The duty cycle of the switching transistor is controlled to maintain regulation of one or more of the secondary winding-developed voltages.

The electron gun assembly incorporated in the video apparatus cathode ray tube (CRT) requires a filament or heater voltage of the order of 6.3 volts, which may be provided by a source of either alternating current (AC) or direct current (DC). A significant increase or decrease of the filament voltage may result in improper operation or damage to the CRT.

It is desirable that the video apparatus be capable of operating at a number of different line rate or deflection frequencies, or be capable of operating at any line rate frequency, between widely spaced frequency limits, in response to the frequency of incoming video information, from a computer, for example. The ability to operate at different line rate frequencies increasing the compatibility of the video apparatus, when used as a computer monitor, with different computers having different operating frequencies and characteristics. When a power supply of the previously described switching type is used in a video apparatus operable at different line rate frequencies, the transformer secondary-developed voltages may change with changes in the line rate frequency. As the line rate frequency changes, the duty cycle of the primary winding switching transistor also changes, with the result that the duty cycle of the secondary winding-developed AC voltage waveforms also change. Accordingly, this causes the rms voltages developed across the transformer secondary windings to change. For the reasons stated previously, a high voltage transformer secondary winding may be an undesirable voltage supply for the CRT filament circuitry in a multiple line rate frequency monitor or video apparatus. Providing additional regulation circuitry for the filament supply in order to maintain a substantially constant filament supply voltage independent of line rate frequency changes increases the cost and complexity of the video apparatus.

In accordance with an aspect of the present invention, a video apparatus operable at a plurality of line deflection frequencies comprises a cathode ray tube incorporating an electron gun assembly that produces an electron beam. A deflection winding is disposed about the tube and deflects the electron beam in response to current flow in the winding. A line deflection rate output circuit produces a current in the winding in response to a first signal. A circuit provides a second signal indicative of a predetermined line deflection frequency. A transformer has a first winding coupled to and energized from the second signal providing circuitry. A second winding responds to the energization of the first winding and provides the first signal. A third winding responds to the energizing of the first winding and provides a third signal that is applied to the electron gun assembly. The third signal has an rms voltage level that remains substantially constant independent of the line deflection frequency.

In the accompanying drawing,
the sole FIGURE is a block and schematic diagram of a portion of a video apparatus in accordance with an aspect of the present invention.

Referring to the FIGURE, there is shown a portion of a video apparatus, illustrated as a color computer monitor, in which a video signal in the form of red, green and blue color video components are applied to the video display apparatus from an external source (not shown), such as a computer, via an input terminal strip 10. The color video components are applied to chrominance and luminance processing circuitry 11 along conductors designated R, G, and B, respectively. The processed video signals as respectively applied to red driver circuitry 12, green driver circuit 13 and blue driver circuit 14. The output of red driver circuit 12 is applied to a cathode 15 which forms part of an electron gun assembly 16 located within the neck of a cathode ray tube (CRT) 17. The structure and operation of electron gun assembly 16 will be explained in more detail later. In a similar manner, the output of green driver circuit 13 is applied to cathode 20 and the output of blue drive circuit 14 is applied to cathode 21.

Also applied to the video display apparatus via terminal strip 10 is a composite synchronizing (sync) signal, designated CS, that illustratively incorporates both line and field rate synchronizing information. The sync signal is applied to deflection processing circuitry 22, where it is separated into respective line and field rate sync information components or pulses. Deflection processing circuitry 22 is illustratively shown as an integrated circuit designated TDA 2595, manufactured, for example, by Signetics Corporation. Manufacturer device terminal numbers are also illustrated within the outline of deflection processing circuitry 22. The field rate, or vertical, sync pulses are applied via a conductor designated VS to vertical deflection circuitry 23 which produces a vertical or field rate deflection current via terminal V and V' in a vertical deflection winding 24, located on the neck of CRT 17. The deflection current flowing in deflection winding 24 creates an electromagnetic deflection field that provides vertical or field rate deflection or scanning of a representative electron beam 25 produced by electron gun assembly 16 in a predetermined pattern across a phosphor display screen 26 located on the front panel of CRT 17.

It is desirable to configure the deflection circuitry of a video apparatus operating as a computer monitor to be able to operate at different deflection or scan frequencies, in order to be compatible with different computers having various operating frequencies, or with computers having two or more selectable line deflection frequencies. Proper operation of the deflection circuits may require adjustment of the operating supply voltages at different deflection or operating frequencies. This is illustratively accomplished in the following manner.

A source of power, such as AC line supply 27, is connected to a rectifying circuit 30 and a filter capacitor 31 to provide a source of unregulated DC voltage at a terminal 32. The unregulated DC voltage is applied to one terminal of a winding 33 of a power transformer 34. The other terminal of winding 33 is connected to the collector of a switching transistor 35. Conduction of transistor 35, determined by control circuit 36, causes current to flow in winding 33 which, by transformer action, causes current to flow in windings 37, 40 and 41. The current in winding 37 is rectified by diode 42 and charges capacitor 43 to develop a DC feedback voltage that is applied to control circuit 36. In response to the feedback voltage, control circuit 36 controls the conduction interval of transistor 35 in order to maintain the voltage across capacitor 43 at a constant regulated level. Regulation of the voltage across capacitor 43 results in regulation of the load supplies derived from transformer windings 40 and 41. Transformer 34 also provides electrical isolation between the "hot" AC line and the "cold" load circuits and user interface connectors, such as input terminal strip 10. Winding 40 current, rectified by diode 44, charges capacitor 45 to provide a DC voltage at a terminal 46 that is used to power various circuits of the video display apparatus, such as chrominance and luminance processing circuit 11, for example. The voltage established across capacitor 47, derived from winding 41 via diode 50, is applied to the drain terminal of a field effect transistor (FET) 51, which forms part of a frequency dependent power supply circuit 52 that operates as follows.

Power supply circuit 52, operating as a DC to DC converter, incorporates pulse width modulating circuit 53, which receives an input signal at a terminal 54 from deflection processing circuitry 22. This input signal comprises pulses occurring at the horizontal deflection or line rate, which are derived in a manner that will be described later. Pulse width modulator circuit 53, illustratively comprises an integrated circuit designated NE5560, manufactured by Signetics Corporation. Pulse width modulator circuit 53 produces an output signal incorporating width-modulated pulses having a frequency determined in response to the input pulse frequency. The output signal of pulse width modulator circuit 53 is applied via coupling capacitor 55 to primary winding 56 of a transformer 57. Secondary winding 60 of transformer 57 has one terminal coupled via capacitor 61 to the cathode of a diode 62, the collector of a transistor 63, one terminal of a resistor 64 and the gate of FET 51. The other terminal of secondary winding 60 is coupled to the anode of diode 62, a transistor bias resistor 65, the emitter of transistor 63, the cathode of a freewheeling diode 66, the other terminal of resistor 64 and the source terminal of FET 51. The source terminal of FET 51 is also coupled to a supply capacitor 67 via an inductor 70. Transformer 57 provides DC isolation that allows the secondary circuits to be referenced to the voltage across capacitor 67.

The deflection rate or frequency-representative pulses produced by pulse width modulator circuit 53 applied to primary winding 56 cause switching of FET 51 by transformer action. Conduction of FET 51 charges capacitor 67 via FET 51 and inductor 70 from the supply voltage developed across capacitor 47. Since the duty cycle of FET 51 is determined by the horizontal deflection frequency, the voltage developed across capacitor 67 will also be dependent upon the horizontal deflection rate or frequency and may therefore be utilized as a supply voltage for circuits that require different operating voltage levels in response to different deflection frequencies. The voltage across capacitor 67 is applied to a winding 71, which forms the primary winding of a conventional flyback-type high voltage transformer 72. The voltage developed across tertiary winding 73 forms a high voltage or ultor potential at a terminal 74 that is applied to CRT 17 to form the accelerating potential for electron beam 25 produced by electron gun assembly 16 of CRT 17. The high voltage level is also applied to resistor chain 85 to form the screen and focus grid potentials that are applied to the screen grid 86 and focus grid 87 of electron gun assembly 16 via terminals 90 and 91, respectively. The voltage developed across a secondary winding 75 is applied to deflection processing circuitry 22 via a terminal 76. This voltage also is used to develop a DC voltage level via diode 77 and a capacitor 80 that provides power to pulse width modulator circuit 53. The voltage developed across secondary winding 92 is rectified by diode 93 and filtered by capacitor 94 to form a DC voltage that is applied to the control grid 95 of electron gun assembly 16 via terminal 96.

In order to avoid dissipating a significant amount of power in FET 51, and hence prevent its overheating, it is important that FET 51 be switched between its conduction states as quickly as possible. Pulses from pulse width modulator circuit 53 are coupled from the primary winding of transformer 57 to the base of transistor 63 via differentiating network 81 comprising resistor 82, capacitor 83, and diode 84. The leading edge of the turn-off pulse for FET 51 is differentiated by differentiating network 81 to form a positive going pulse signal which is applied to the base of transistor 63. The differentiated pulse from the trailing edge of the modulator 53 pulse is reduced in amplitude by diode 84. The differentiated positive-going pulses quickly turn on transistor 63 which in turn rapidly turn off FET 51.

As previously described, it is desirable that a video apparatus, particularly a video apparatus used as a computer monitor, be capable of operating at different video information or line rate frequencies in order to enhance the compatibility of the video apparatus when used with different computers or with computers having multiple frequency capability. The video apparatus shown in the FIGURE will synchronize its line deflection frequency to that of any incoming video information signal having a line rate frequency occurring between predetermined upper and lower frequency limits.

Deflection processing circuitry 22 produces output signal pulses at terminal 54, for example, having a pulse frequency determined by the level of the voltage applied to a terminal 97. Synchronization of the frequency of the output pulse signal at terminal 54 with the frequency of the incoming video information as represented by the horizontal deflection or line rate synchronizing signal component on conductor CS is provided as follows. Voltage sweep generator 100, which may be of conventional design, produces a triangular output waveform that varies between a lower voltage level illustratively of the order of 1 volt and an upper voltage level illustratively of the order of 15 volts. The upper and lower voltage limits are selected so that the voltage levels that are applied to terminal 97 of deflection processing circuitry 22 result in an output signal frequency range that encompasses the desired line rate or frequency operating range of the video apparatus.

As the output signal voltage of voltage sweep generator 100 is cyclically swept or varied through its voltage range, the horizontal or line rate oscillator of deflection processing circuitry 22 will in turn cyclically vary its operating frequency. During the time that the oscillator frequency does not correspond to the line deflection frequency of the incoming video information, as represented by the horizontal sync signal component appearing on conductor CS, the coincidence detector output of deflection processing circuitry 22 at terminal 101 will be a defined low level signal. This low level output, applied to the base of a transistor 102, will cause transistor 102 to be rendered nonconductive, which in turn maintains transistor 103 nonconductive. With transistor 103 nonconductive, the voltage at the collector of transistor 103 is high so that field effect transistor (FET) 104 is rendered conductive. Conduction of FET 104 allows the output voltage of voltage sweep generator 100 to charge capacitor 105, so that the voltage across capacitor 105 will follow the output voltage of voltage sweep generator 100. Amplifier 106, configured as a sample and hold circuit, acts to apply the voltage across capacitor 105 to input terminal 97 of deflection processing circuitry 22.

As the frequency of the oscillator of deflection processing circuitry 22 is varied in response to the varying output voltage of voltage sweep generator 100, the oscillator frequency will at some time correspond to the frequency of the incoming horizontal rate sync signal. When this occurs, the coincidence detector output at terminal 101 will become a defined high level signal, thereby rendering transistor 102 conductive, which in turn causes transistor 103 to become conductive. The collector voltage of transistor 103 will fall to a level sufficient to render FET 104 nonconductive. The voltage across capacitor 105 will then no longer follow the varying output voltage of voltage sweep generator 100, but will instead be maintained at the voltage level required to provide an oscillator frequency corresponding to the incoming line deflection frequency. The input impedance of amplifier 106 of very high so that the voltage level across capacitor 105 is maintained at a substantially constant level. Each time the incoming video information line rate frequency is changed, the oscillator of the deflection processing circuitry 22 is varied in a predetermined manner until coincidence with the incoming line deflection frequency is again established. The rate at which the output signal of voltage sweep generator 100 is varied between the frequency limits, illustratively of the order of 1 second, is selected to insure that any load circuit supply voltages that are required to be changed in response to the change in operating frequency have sufficient time to reach their desired voltage levels before the oscillator frequency is changed.

The output pulses of deflection processing circuitry 22, which appear at terminal 54, are also applied to the base of a line rate driver transistor 107 and cause transistor 107 to switch conductive states at the line rate or deflection frequency. These switching pulses are transmitted via a winding 109 of a driver transformer 110 to the base of a horizontal output transistor 111, which forms part of a resonant retrace type of deflection output circuit 112. The output circuit 112 illustratively includes a damper diode 113, a retrace capacitor 114, a horizontal or line deflection winding 115, located on the neck of CRT 17 and connected via terminals H and H', and an S-shaping capacitor 116. The deflection output circuit 112 causes a horizontal or line rate deflection current to flow in deflection winding 115, which creates an electromagnetic deflection field that provides horizontal on line rate deflection or scanning of electron beam 25 across display screen 26 of CRT 17. Power is supplied to output circuit 112 via terminal 117 of winding 71. Retrace or flyback pulses produced by the switching of transistor 111 that appear across winding 71 result in the previously described voltages being developed across windings 73, 75 and 92.

Cathodes 15, 20, and 21 of electron gun assembly 16 emit electrons which are formed into distinct beams and are focused onto display screen 26 of CRT 17 by the physical structure and voltage potentials applied to control grid 95, screen grid 86 and focus grid 87. The signals from red, green and blue driver circuits 12, 13, and 14 applied to cathodes 15, 20, and 21 control the quantity of electronics emitted and hence the intensity of the associated electron beams. By modulating the intensity of the deflected or scanned electron beams in accordance with the video information signal, a reproduced video image is obtained.

In order to permit cathodes 15, 20, and 21 to emit electrons, the cathodes must be heated. This is accomplished by a heater or filament circuit 120 of electron gun assembly 16. Although the heater circuit 120 may operate in response to either an AC or DC applied voltage, the rms voltage applied to the heater circuit must be carefully controlled, as an increase or a decrease of the heater rms voltage may cause the electron gun assembly to operate improperly or become damaged. Since the voltage level required for the heater circuit, of the order of 6.3 volts, is often less than the other video apparatus voltage supply levels, deriving the heater supply from one of the other video apparatus regulated load circuit supplies requires a voltage dropping resistor, which adds to the cost of the video apparatus both in terms of added components and wasted power.

In accordance with an aspect of the present invention, a heater voltage supply comprises a winding 121, located on line deflection driver transformer 110. The duty cycle of switching transistor 107 will remain substantially constant independent of the line deflection frequency, with the result that the duty cycle of the AC voltage waveform developed across winding 121 will also remain substantially constant. Hence, the rms voltage developed across winding 121 will remain constant. This allows the AC voltage developed across winding 121 to be applied to heater circuit 120 without the need for additional voltage rectification or voltage regulation circuitry, which would otherwise increase the cost and complexity of the video apparatus. The heater supply voltage will therefore be maintained at a substantially constant rms level independent of the line deflection operating frequency of the video apparatus.

What is claimed is:

1. Video apparatus operable at a line deflection frequency selected from widely spaced frequency limits, comprising:
   a cathode ray tube incorporating an electron gun assembly for producing an electron beam;
   a deflection winding disposed about said cathode ray tube for deflecting said electron beam in response to current flow in said deflection winding;
   a line deflection rate output means responsive to a first signal for producing said current in said deflection winding;
   means for providing a second signal indicative of a predetermined selected line deflection frequency within said widely spaced frequency limitis, said second signal having a substantially constant duty cycle independent of the selected line deflection frequency; and a transformer comprising:

a first winding coupled to said means for providing said second signal and being energized therefrom;

a second winding responsive to the energization of said first winding for providing said first signal; and a third winding responsive to the energization of said first winding for providing a third signal to said electron gun assembly, said third signal having an rms voltage level that remains substantially constant independent of said line deflection frequency that is selected.

* * * * *